(12) United States Patent
Melakari et al.

(10) Patent No.: US 10,206,044 B2
(45) Date of Patent: Feb. 12, 2019

(54) DISPLAY STRUCTURE HAVING A VISUAL DISPLAY AND AN AUDIO OUTPUT

(71) Applicant: Microsoft Technology Licensing, LLC, Redmond, WA (US)

(72) Inventors: Klaus Melakari, Oollu (FI); Pasi Kemppinen, Tampere (FI)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/260,241

(22) Filed: Sep. 8, 2016

(65) Prior Publication Data

US 2018/0070180 A1    Mar. 8, 2018

(51) Int. Cl.
| | |
|---|---|
| *H04R 7/04* | (2006.01) |
| *G06F 1/16* | (2006.01) |
| *G09G 3/3208* | (2016.01) |
| *G06F 3/16* | (2006.01) |
| *G06F 3/01* | (2006.01) |
| *H04R 17/00* | (2006.01) |

(52) U.S. Cl.
CPC ........... *H04R 7/045* (2013.01); *G06F 1/1605* (2013.01); *G06F 1/1652* (2013.01); *G06F 3/016* (2013.01); *G06F 3/16* (2013.01); *G09G 3/3208* (2013.01); *H04R 17/005* (2013.01); *H04R 2400/03* (2013.01); *H04R 2499/15* (2013.01)

(58) Field of Classification Search
CPC .. H04R 7/045; H04R 17/005; H04R 2400/03; H04R 2499/15; G06F 1/1605; G06F 1/1652; G03F 3/016; G03F 3/16; G09G 3/3208
See application file for complete search history.

(56) References Cited

U.S. PATENT DOCUMENTS

| | | | |
|---|---|---|---|
| 7,869,589 B2 | 1/2011 | Tuovinen | |
| 8,068,635 B2 | 11/2011 | Carlson et al. | |
| 9,131,039 B2 | 9/2015 | Behles | |
| 2007/0202917 A1 | 8/2007 | Phelps et al. | |
| 2009/0072662 A1* | 3/2009 | Sadler | G06F 1/3203 |
| | | | 310/319 |

(Continued)

FOREIGN PATENT DOCUMENTS

| | | |
|---|---|---|
| EP | 2288179 A1 | 2/2011 |
| WO | 2011125408 A1 | 10/2011 |
| WO | 2015186771 A1 | 12/2015 |

OTHER PUBLICATIONS

Poupyrev, et al., "Ambient Touch: Designing Tactile Interfaces for Handheld Devices", In Proceedings of the 15th annual ACM symposium on User interface software and technology, vol. 4, Issue 2, Oct. 27, 2002, pp. 51-60.

(Continued)

*Primary Examiner* — Tuan D Nguyen

(57) ABSTRACT

A display surface structure comprises a deformable transparent surface layer, a visual display layer visible through the deformable transparent surface layer, a piezo-electric layer in mechanical communication with the deformable transparent surface layer, and a drive circuit in electrical communication with the piezo-electric layer. The drive circuit sends a drive signal to the piezo-electric layer to cause the piezo-electric layer to deform the deformable transparent surface layer and generate an audio output.

20 Claims, 6 Drawing Sheets

(56) References Cited

U.S. PATENT DOCUMENTS

| | | | |
|---|---|---|---|
| 2010/0225600 A1* | 9/2010 | Dai | G06F 3/016 |
| | | | 345/173 |
| 2012/0242592 A1 | 9/2012 | Rothkopf et al. | |
| 2012/0249459 A1* | 10/2012 | Sashida | G06F 3/016 |
| | | | 345/173 |
| 2013/0077810 A1 | 3/2013 | Mellow et al. | |
| 2013/0250502 A1 | 9/2013 | Tossavainen et al. | |
| 2013/0328447 A1* | 12/2013 | Park | H01L 41/0973 |
| | | | 310/332 |
| 2013/0335211 A1 | 12/2013 | Kobayashi | |
| 2014/0054348 A1* | 2/2014 | Teranishi | C03B 33/0215 |
| | | | 225/2 |
| 2014/0098075 A1* | 4/2014 | Kwak | G06F 3/0487 |
| | | | 345/204 |
| 2014/0230575 A1 | 8/2014 | Picciotto et al. | |
| 2015/0022459 A1 | 1/2015 | Yliaho et al. | |
| 2015/0185842 A1 | 7/2015 | Picciotto et al. | |
| 2017/0178470 A1* | 6/2017 | Khoshkava | G06F 3/016 |

OTHER PUBLICATIONS

"International Search Report and Written Opinion Issued in PCT Application No. PCT/US2017/048779", dated Oct. 30, 2017, 13 Pages.

\* cited by examiner

DISPLAY STRUCTURE HAVING A VISUAL DISPLAY AND AN AUDIO OUTPUT

BACKGROUND

It is commonly a requirement for mobile devices to provide both a visual display and audio output. Typically, mobile devices satisfy this requirement by having a visual display and a separate dedicated speaker or speakers. However, this approach can have the disadvantage that sufficient volume must be found within the mobile device to contain the visual display and the speaker or speakers. Further, in mobile devices having a large amount, or all, of a front face of the mobile device occupied by the visual display it can be difficult to find sufficient space on the front face for a speaker opening, forcing the speakers to be located on the sides or rear of the mobile device, where they direct sound away from a user.

The embodiments described below are not limited to implementations which solve any or all of the disadvantages of known speaker or display technologies.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

A display surface structure comprises a deformable transparent surface layer, a visual display layer visible through the deformable transparent surface layer, a piezo-electric layer in mechanical communication with the deformable transparent surface layer, and a drive circuit in electrical communication with the piezo-electric layer. The drive circuit sends a drive signal to the piezo-electric layer to cause the piezo-electric layer to deform the deformable transparent surface layer and generate an audio output.

In one example, the present disclosure provides a display structure comprising: a deformable transparent surface layer; a visual display layer visible through the deformable transparent surface layer; a piezo-electric layer in mechanical communication with the deformable transparent surface layer; and a drive circuit in electrical communication with the piezo-electric layer, wherein the drive circuit is arranged to send a drive signal (406) to the piezo-electric layer which will cause the piezo-electric layer to deform the deformable transparent surface layer to generate an audio output.

In another example, the present disclosure provides a method of providing a visual and audio output comprising: providing a display structure comprising: a deformable transparent surface layer; a visual display layer visible through the deformable transparent surface layer; a piezo-electric layer in mechanical communication with the deformable transparent surface layer; and providing a drive signal to the piezo-electric layer, whereby the drive signal will cause the piezo-electric layer to deform the deformable transparent surface layer to generate an audio output.

In another example, the present disclosure provides a mobile device comprising a display, the display comprising: a deformable transparent surface layer; a visual display layer visible through the deformable transparent surface layer; and a piezo-electric layer in mechanical communication with the deformable transparent surface layer; wherein the display is rigidly secured to a structure of the mobile device; and the mobile device further comprises a drive circuit in electrical communication with the piezo-electric layer, wherein the drive circuit is arranged to send a drive signal to the piezo-electric layer which will cause the piezo-electric layer to deform the deformable transparent surface layer to generate an audio output.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example are constructed or utilized. The description sets forth the functions of the example and the sequence of operations for constructing and operating the example. However, the same or equivalent functions and sequences may be accomplished by different examples.

A combined visual and audio display is described.

Although the present examples are described and illustrated herein as being implemented in a mobile phone, the mobile phone described is provided as an example and not a limitation. As those skilled in the art will appreciate, the present examples are suitable for application in a variety of different types of devices, and in particular mobile devices, having display systems.

Figure 1:
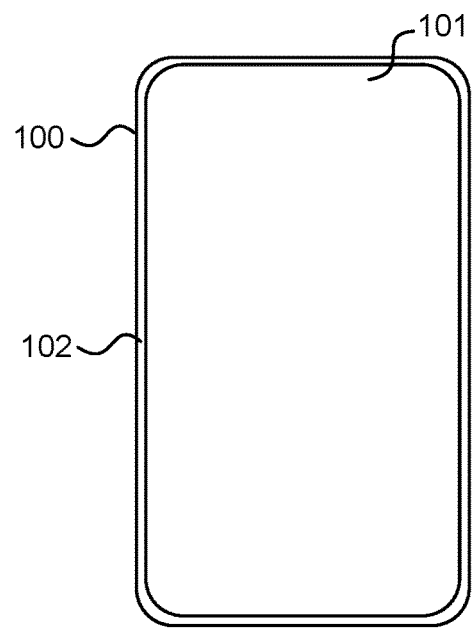
FIG. 1 illustrates a view of a mobile phone having a combined visual and audio display according to an illustrative example.

FIG. 1 is a view of a mobile phone 100 having a combined visual and audio display 101. The combined visual and audio display 101 comprises substantially all of a front surface of the mobile phone 100, and is surrounded by a bezel 102.

The combined visual and audio display 101 is arranged to provide a visual display, and to also be able to generate audio or sound output, so that the combined visual and audio display 101 can also act as a loudspeaker.

Figure 2:
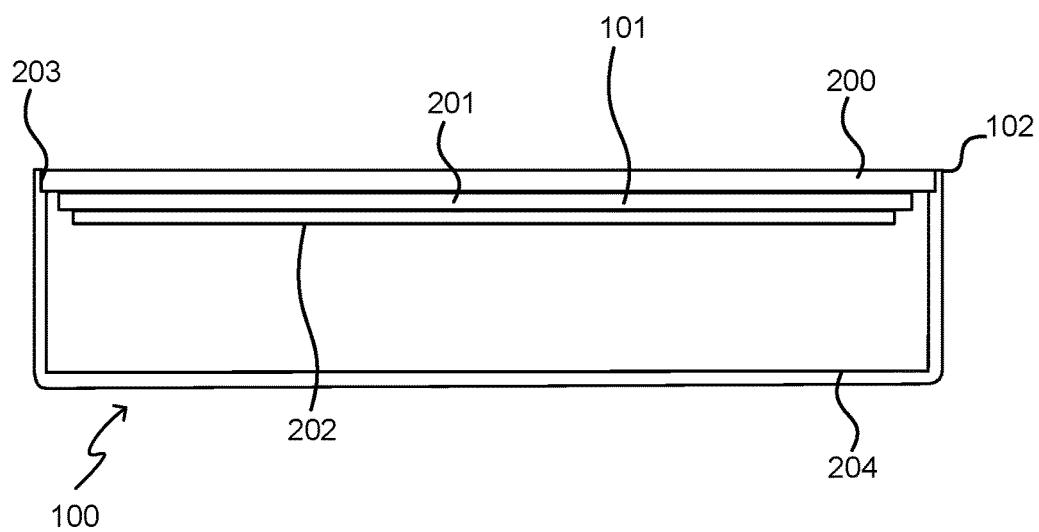
FIG. 2 illustrates a cross-section of a combined visual and audio display according to an illustrative example.

FIG. 2 is a cross-sectional view of the combined visual and audio display 101 of FIG. 1.

The combined visual and audio display 101 comprises a display window 200 forming a surface layer of the combined visual and audio display 101, an organic LED (OLED) display panel 201 forming a display layer of the combined visual and audio display 101, and a piezo-electric drive layer 202.

The display window 200 has a front face and a rear face and is deformable. The front face of the display window 200 forms an outer surface of the combined visual and audio display 101. A front face of the OLED display panel 201 is attached to a rear face of the display window 200, and a front face of the piezo-electric drive layer 202 is in turn attached to a rear face of the OLED display panel 201 so that the OLED display panel 201 provides mechanical communication between the piezo-electric drive layer 202 and the display window 200. Accordingly, the combined visual and audio display 101 has a layered structure formed by a stack of the display window 200, the OLED display panel 201, and the piezo-electric drive layer 202.

The OLED display panel 201 is arranged so that the front face of the OLED display panel 201 is the display surface of the OLED display panel 201. The display window 200 is transparent so that the display surface of the OLED display panel 201 is visible through the display window 200. In some examples the display window 200 may be a glass sheet.

In the illustrated example the display window 200, the OLED display panel 201, and the piezo-electric drive layer 202 are glued together to form the combined visual and audio display 101. To improve clarity the glue is not shown in the figures.

In the example illustrated in FIG. 2 the OLED display panel 201 has a smaller areal extent than the display window 200, and the piezo-electric drive layer 202 in turn has a smaller areal extent than the OLED display panel 201. This difference in areal extent of the different layers of the combined visual and audio display 101 may simplify manufacture of the combined visual and audio display 101, and may simplify attachment of the combined visual and audio display 101 to the mobile phone 100.

The combined visual and audio display 101 is attached to the mobile phone 100 by an outer edge 203 of the display window 200 being rigidly secured to a structure of the mobile phone 100. In particular, the combined visual and audio display 101 is rigidly secured to a frame 204 of the mobile phone 100. In some examples the outer edge 203 of the display window 200 is rigidly secured to the frame 204 of the mobile phone 100 by glue. In some examples the display window 200 is secured within an aperture defined by the frame 204 so that the frame 204 forms a bezel 102 around the display window 200. The combined visual and audio display 101 can be secured directly to the frame 204 of the mobile phone 100 without any intermediate sub-frame being required.

In operation of the mobile phone 100 electrical signals applied to the piezo-electric drive layer 202 can cause the piezo-electric drive layer 202 to apply physical forces to the display window 200 through the mechanical connection provided by the OLED display panel 201 to deform the display window 200 so that the front face of the display window, which is the outer surface of the combined visual and audio display 101, acts as a speaker diaphragm to generate audible signals in the air surrounding the mobile phone 100.

The deformation of the display window 200 can take the form of a flexing or bending of the display window 200 so that a central part of the display window 200 moves back and forth inwardly and outwardly in a direction substantially perpendicular to the front face of the display window 200, commonly referred to as the 'z' direction.

In other examples the mechanical connection between the piezo-electric drive layer 202 and the display window 200 may be additionally or alternatively be provided in other ways.

The rigid securing of the combined visual and audio display 101, and in particular of the display window 200, to the mobile phone 100, may assist in ensuring that the physical forces generated by the piezo-electric drive layer 202 are efficiently transformed into deformation and flexing of the display window 200, rather than bodily movement of the combined visual and audio display 101. In the illustrated example this rigid securing is provided by the rigid securing of the outer edge 203 of the display window 200 to the frame 204.

Rigid securing of the combined visual and audio display 101, and in particular of the display window 200, to the mobile phone 100 to substantially prevent movement of the combined visual and audio display 101, and in particular the display window 200, in a direction substantially perpendicular to the front face of the display window 200 may be particularly effective in ensuring that the physical forces generated by the piezo-electric drive layer 202 are efficiently transformed into deformation and flexing of the display window 200.

It will be understood that the illustrated example is shown in a schematic form to illustrate technical concepts and that in practice further components may be used.

Figure 3:
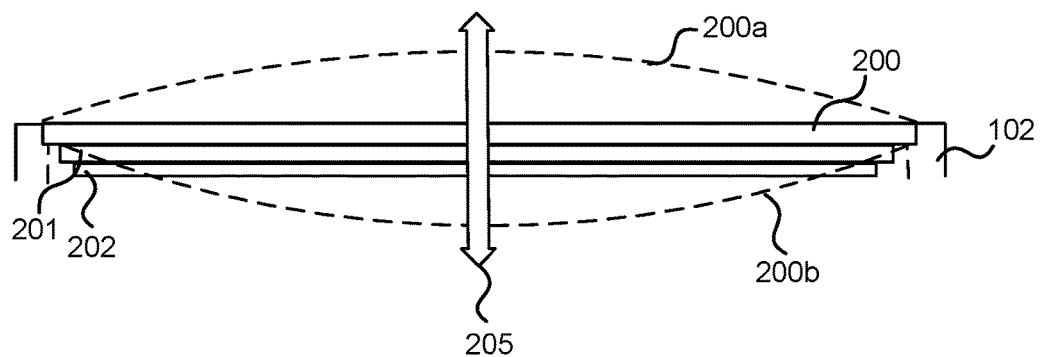
FIG. 3 illustrates a schematic representation of a combined visual and audio display according to an illustrative example in an audio output condition.

FIG. 3 shows a cross-sectional view of the combined visual and audio display 101 of FIG. 1 in which the direction of the inward and outward movement of the central part of the combined visual and audio display 101 is indicated by a double ended arrow 205.

As is discussed above, the outer edge 203 of the display window 200 is rigidly secured to the frame 204 of the mobile phone 100. Accordingly, this outer edge 203 remains stationary when the central part of the combined visual and audio display 101 moves inwardly and outwardly. The inward and outward movement of the central part of the combined visual and audio display 101 is enabled by deformation of the combined visual and audio display 101, and not by bodily movement of the combined visual and audio display 101 as a whole relative to the frame 204 of the mobile phone 100.

In FIG. 3 the deformation of the combined visual and audio display 101 is illustrated by the dashed lines 200a and 200b which show the maximum outward and inward movement of the display panel 200. The dashed lines 200a and 200b may be regarded as showing the boundaries of an envelope within which the display panel 200 moves.

The combined visual and audio display 101 can be rigidly secured to the mobile phone 100 without any requirement to permit bodily movement of the combined visual and audio display 101 relative to the mobile phone 100, or for a flexible connection between the combined visual and audio display 101 and the mobile phone 100. No subframe is required to connect the combined visual and audio display 101 to the mobile phone 1000. This may simplify the structure of the mobile phone 100 and permit greater integration, and may allow the mobile phone to be made more compact, that is, less wide and/or thick.

Figure 4:
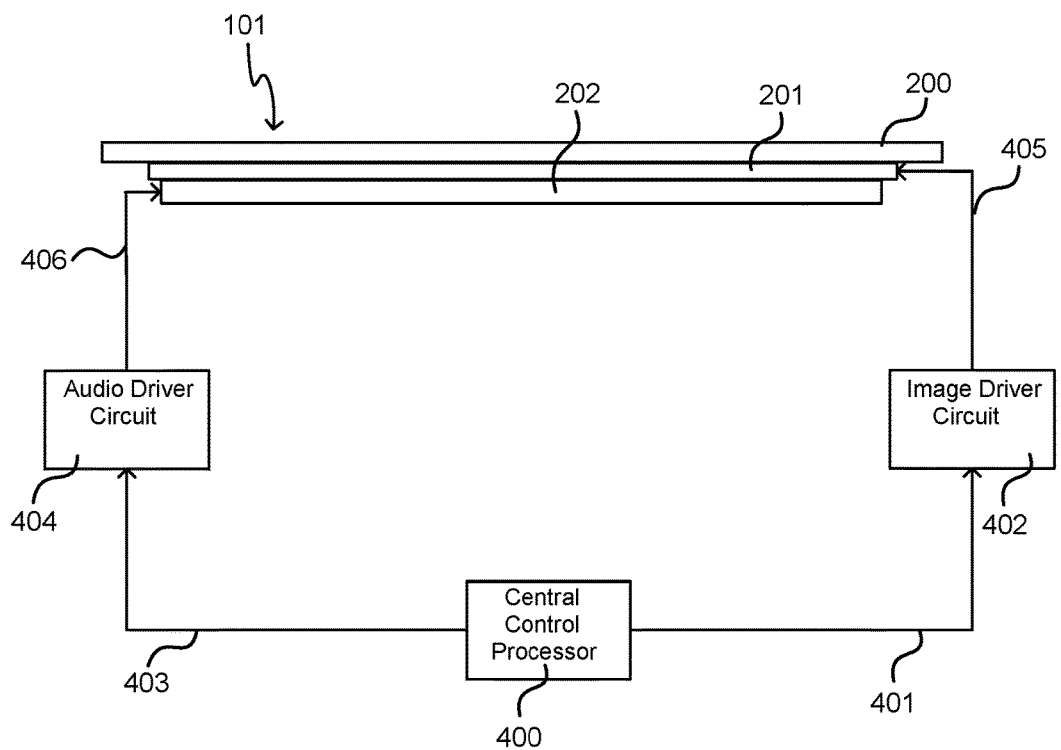
FIG. 4 illustrates a schematic representation of an example of a device incorporating a combined visual and audio display.

FIG. 4 shows a schematic diagram of a drive arrangement of the mobile phone 100 useable to drive the combined visual and audio display 101 to provide visual and audible output.

A central control processor 400 of the mobile phone 100 determines images to be displayed by the combined visual and audio display 101 and sounds to be emitted by the combined visual and audio display 101. The processor 400 sends image data 401 to an image driver circuit 402, and sends audio data 403 to an audio driver circuit 404.

The image driver circuit 402 generates image drive signals 405 based on the image data 401 and sends the image drive signals 405 to the OLED display panel 201 of the combined visual and audio display 101. The image drive signals 405 drive the OLED display panel 201 to generate the determined images on the OLED display panel 201, which generated determined images are visible through the display window 200.

The audio driver circuit 404 generates audio drive signals 406 based on the audio data 403 and sends the audio drive signals 406 to the piezo-electric drive layer 202 of the combined visual and audio display 101. The audio drive signals 406 drive the piezo-electric drive layer 202 to deform the combined visual and audio display 101 to move the front face of the display window 200 to generate the determined audio sounds in the air surrounding the mobile phone 100, which sounds are audible by passage through the surrounding air.

In alternative examples the combined visual and audio display 101 may be arranged to further provide a haptic or touch output, in addition to the visual display and audio output.

The combined visual and audio display 101 can provide haptic output by suitable deformation of the combined visual and audio display 101 by the piezo-electric drive layer 202. The deformation of the combined visual and audio display 101 can provide a haptic or touch feedback by the movement of the front face of the display window 200 in contact with a user finger, or other user body part.

Figure 5:
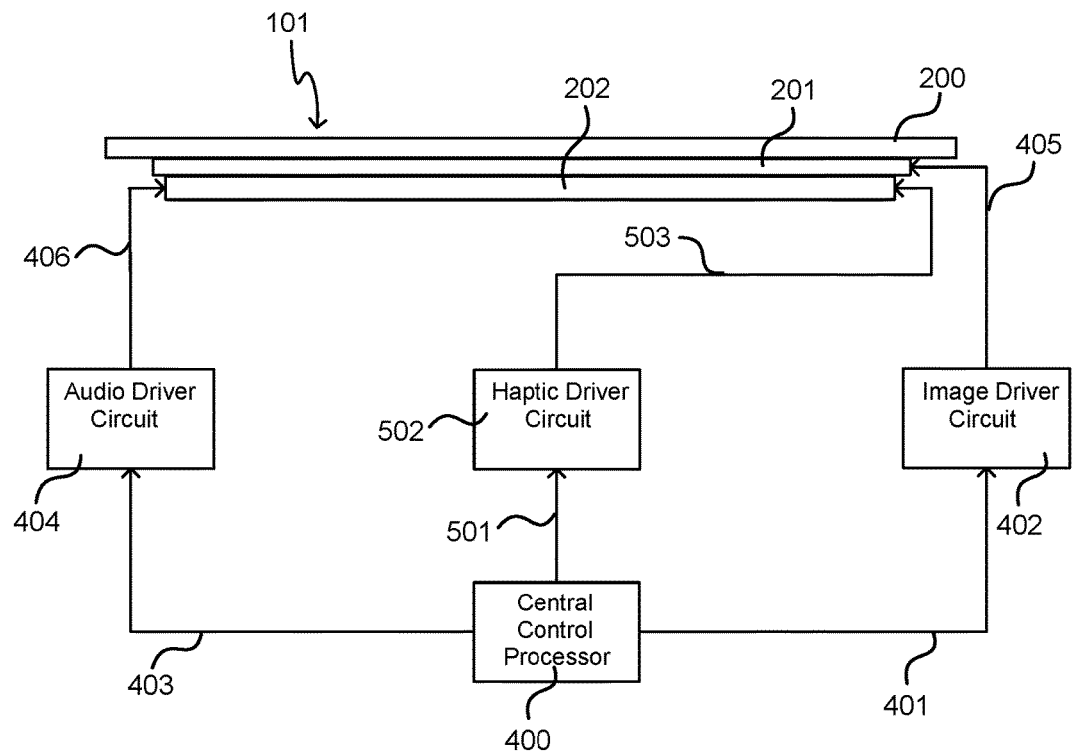
FIG. 5 illustrates a schematic representation of an example of a device incorporating a combined visual, audio and haptic display.

FIG. 5 shows a schematic diagram of a drive arrangement of the mobile phone 100 useable to drive the combined visual and audio display 101 to provide visual, audio and haptic outputs.

A central control processor 400 of the mobile phone 100 determines haptic feedback to be provided by the combined visual and audio display 101, images to be displayed by the combined visual and audio display 101, and sounds to be emitted by the combined visual and audio display 101. The processor 400 sends haptic data 501 to a haptic driver circuit 502, and sends image data 401 to an image driver circuit 402 and sends audio data 403 to an audio driver circuit 404, similarly to the example of FIG. 4.

The haptic driver circuit 502 generates haptic drive signals 503 and sends the haptic drive signals 503 to the piezo-electric drive layer 202 of the combined visual and audio display 101. The haptic drive signals 503 drive the piezo-electric drive layer 202 to deform the combined visual and audio display 101 to move the front face of the display window 200 to generate the determined haptic feedback to a user finger, or other body part, touching the front face of the display window 200.

The image driver circuit 402 generates image drive signals 405 and sends them to the OLED display panel 201 of the combined visual and audio display 101 to generate the determined images on the OLED display panel 201, and the audio driver circuit 404 generates audio drive signals 406 and sends them to the piezo-electric drive layer 202 to drive the piezo-electric drive layer 202 to deform the combined visual and audio display 101 to move the front face of the display window 200 to generate the determined audio sounds, similarly to the example of FIG. 4.

Figure 6:
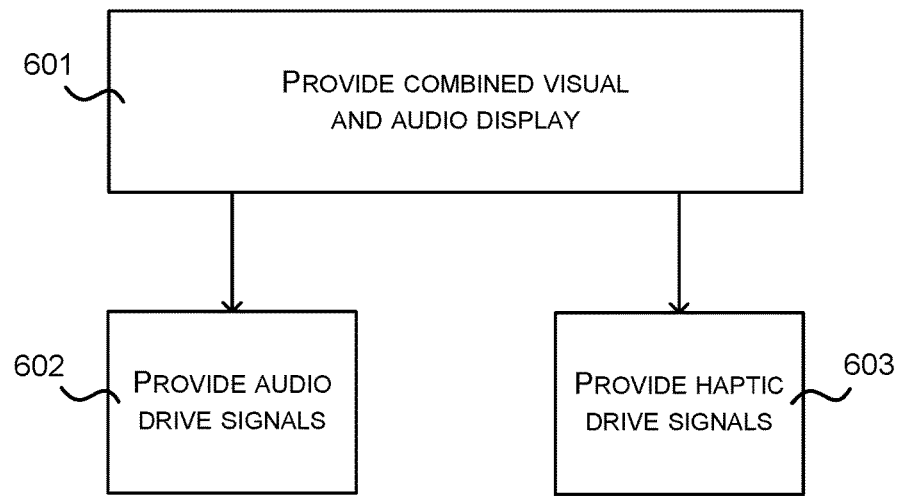
FIG. 6 illustrates a flow diagram of a method of use of a combined visual and audio display.

FIG. 6 shows a flow diagram of a method 600 of providing visual and audible outputs. First, a combined visual and audio display 101 provided (block 601). Then, the audio driver circuit 404 provides audio drive signals 406 to the piezo-electric layer 202 of the combined visual and audio display 101 to deform combined visual and audio display 101 to move the front face of the display window 200 to generate an audio sound output (block 602).

Optionally, where visual, audible and haptic outputs are to be provided the method 600 may further comprise a haptic driver circuit 502 providing haptic drive signals 503 to the piezo-electric layer 202 of the combined visual and audio display 101 to deform combined visual and audio display 101 to move the front face of the display window 200 to generate haptic feedback (block 603).

The example of FIG. 5 uses a separate audio driver circuit 404 and haptic driver circuit 502. This may be convenient because the audio drive signals 406 and the haptic drive signals 503 may be in widely separated frequency bands.

The examples described above have the display window 200, the OLED display panel 201, and the piezo-electric drive layer 202 formed in a stack with the OLED display panel 201 located between the display window 200 and the piezo-electric drive layer 202. In other examples the order of the layers of the stack may be changed. In some examples the piezo-electric drive layer may be located between the display window and the OLED display panel. In such examples the piezo-electric drive layer may be formed of a transparent piezo-electric material. In such examples the mechanical communication between the display window 200 and the piezo-electric drive layer 202 may be provided by direct contact between the display window 200 and the piezo-electric drive layer 202.

The examples described above have a single piezo-electric drive layer 202. In other examples multiple piezo-electric drive layers may be provided. In some examples a first piezo-electric drive layer attached to a rear face of the OLED display panel and a second piezo-electric drive layer may be located between the display window and the OLED display panel. In such examples the second piezo-electric drive layer may be formed of a transparent piezo-electric material.

The example of FIG. 5 has a common piezo-electric layer 202 driven by both the audio drive signals 406 and the haptic drive signals 503. In some alternative examples multiple piezo-electric drive layers may be provided with the audio drive signals 406 and the haptic drive signals 503 driving different ones of the multiple piezo-electric drive layers.

In some examples the piezo-electric drive layer 202 may be patterned. In such examples the patterning may define separately addressable parts of the piezo-electric drive layer which are separately addressable by the audio drive signals, and any haptic drive signals, in order to improve performance. In some examples the audio drive signals and the haptic drive signals may address separate parts of the patterned piezo-electric drive layer 202.

In the illustrated examples the display window 200 may be a glass sheet. In other examples the display window 200 may be formed of other transparent materials in addition to, or instead of, glass.

In the illustrated examples the display window 200, the OLED display panel 201, and the piezo-electric drive layer 202 are glued together to form the combined visual and audio display 101. In other examples alternative means may be used to form the display window 200, the OLED display panel 201, and the piezo-electric drive layer 202 into the combined visual and audio display 101.

In the illustrated examples the OLED display panel 201 has a smaller areal extent than the display window 200, and the piezo-electric drive layer 202 in turn has a smaller areal extent than the OLED display panel 201. In examples having a different order and/or number of different layers making up the combined visual and audio display 101 the relative areal sizes of the OLED display panel 201, the display window 200, and the piezo-electric drive layer 202 may be different. In some examples the OLED display panel 201, the display window 200, and the piezo-electric drive layer 202 may all have the same areal extent.

In examples where the OLED display panel 201 and/or the piezo-electric drive layer 202 have the same areal extent as the display window 200 the OLED display panel 201 and/or the piezo-electric drive layer 202 may be secured to the frame 204 additionally, or alternatively, to the display window 200.

In the illustrated examples the combined visual and audio display 101 comprises an OLED display panel 201. In alternative examples a laminated LCD display may be used instead of the OLED display panel. In such examples the laminated LCD display may comprise a backlight. In alternative examples other types of visual display panel may be used. Any display panel used must be sufficiently flexible to be driven at audio frequencies without failure.

In the illustrated examples the display window 200 forms an outer surface of the combined visual and audio display 101. In some examples the outer surface of the combined visual and audio display may be formed by elements formed on the display window, such as protective layers.

In the illustrated examples the combined visual and audio display 101 is rigidly secured to the frame of the mobile phone 100. In other examples the combined visual and audio display may be rigidly secured to other parts of the structure of a mobile phone.

The image driver circuit 402, audio driver circuit 404, and haptic driver circuit 502 may comprise one or more processors. These processors and the central control processor 400 of the mobile phone 100 may be microprocessors, controllers or any other suitable type of processors for processing computer executable instructions to control the operation of the display.

Alternatively, or in addition, the functionality described herein is performed, at least in part, by one or more hardware logic components. For example, and without limitation, illustrative types of hardware logic components that are optionally used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Graphics Processing Units (GPUs).

The illustrated examples relate to a display of a mobile phone. In alternative examples the display may be used in other types of devices, and in particular in other types of mobile devices. The display may, for example, be used in a laptop computer, tablet computer or a PDA.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The operations of the methods described herein may be carried out in any suitable order, or simultaneously where appropriate. Additionally, individual blocks may be deleted from any of the methods without departing from the scope of the subject matter described herein. Aspects of any of the examples described above may be combined with aspects of any of the other examples described to form further examples without losing the effect sought.

Alternatively or in addition to the other examples described herein, examples include any combination of the following:

A display structure comprising: a deformable transparent surface layer; a visual display layer visible through the deformable transparent surface layer; a piezo-electric layer in mechanical communication with the deformable transparent surface layer; and a drive circuit in electrical communication with the piezo-electric layer, wherein the drive circuit is arranged to send a drive signal to the piezo-electric layer which will cause the piezo-electric layer to deform the deformable transparent surface layer to generate an audio output.

Preferably, the visual display layer, and the piezo-electric layer are arranged in a stack.

Preferably, the visual display layer is located in the stack between the deformable transparent surface layer and the piezo-electric layer.

Preferably, the piezo-electric layer is located in the stack between the deformable transparent surface layer and the visual display layer.

Preferably, the different layers of the stack are glued together.

Preferably, the deformable transparent surface layer is glass.

Preferably, the visual display layer is an organic light emitting diode 'OLED' display.

Preferably the display structure further comprises a second drive circuit in electrical communication with the piezo-electric layer, wherein the second drive circuit is arranged to send a second drive signal to the piezo-electric layer which will cause the piezo-electric layer to deform the deformable transparent surface layer to generate a haptic output.

A method of providing a visual and audio output comprising: providing a display structure comprising: a deformable transparent surface layer; a visual display layer visible through the deformable transparent surface layer; a piezo-electric layer in mechanical communication with the deformable transparent surface layer; and providing a drive signal to the piezo-electric layer, whereby the drive signal will cause the piezo-electric layer to deform the deformable transparent surface layer to generate an audio output.

Preferably, the deformable transparent surface layer, the visual display layer, and the piezo-electric layer are arranged in a stack.

Preferably, the visual display layer is located in the stack between the deformable transparent surface layer and the piezo-electric layer, or the piezo-electric layer is located in the stack between the deformable transparent surface layer and the visual display layer.

Preferably, the method further comprises providing a second drive signal to the piezo-electric layer, whereby the second drive signal will cause the piezo-electric layer to deform the deformable transparent surface layer to generate a haptic output.

A mobile device comprising a display, the display comprising: a deformable transparent surface layer; a visual display layer visible through the deformable transparent surface layer; and a piezo-electric layer in mechanical communication with the deformable transparent surface layer; wherein the display is rigidly secured to a structure of the mobile device; and the mobile device further comprises a drive circuit in electrical communication with the piezo-electric layer, wherein the drive circuit is arranged to send a drive signal to the piezo-electric layer which will cause the piezo-electric layer to deform the deformable transparent surface layer to generate an audio output.

Preferably, the deformable transparent surface layer is rigidly secured to the structure of the mobile device.

Preferably, the deformable transparent surface layer is rigidly secured to the structure of the mobile device by glue.

Preferably, the display is rigidly secured to a structure of the mobile device to prevent relative movement of the display and the structure of the mobile device in a direction perpendicular to the deformable transparent surface.

Preferably, the display is rigidly secured to a frame of the mobile device.

Preferably, the deformable transparent surface layer, the visual display layer, and the piezo-electric layer are arranged in a stack.

Preferably, the visual display layer is located in the stack between the deformable transparent surface layer and the piezo-electric layer, or the piezo-electric layer is located in the stack between the deformable transparent surface layer and the visual display layer.

Preferably, the mobile device further comprises a second drive circuit in electrical communication with the piezo-electric layer, wherein the second drive circuit is arranged to send a second drive signal to the piezo-electric layer which will cause the piezo-electric layer to deform the deformable transparent surface layer to generate a haptic output.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A display structure comprising:
   a deformable transparent surface layer comprising an outer edge that is directly coupled to a structure of a mobile device;
   a visual display layer visible through the deformable transparent surface layer;
   a piezo-electric layer in mechanical communication with the deformable transparent surface layer; and
   a drive circuit in electrical communication with the piezo-electric layer, wherein the drive circuit is arranged to send a drive signal to the piezo-electric layer which will cause the piezo-electric layer to deform the deformable transparent surface layer to generate an audio output.

2. The display structure according to claim 1 in which the deformable transparent surface layer, the visual display layer, and the piezo-electric layer are arranged in a stack.

3. The display structure according to claim 2 in which the visual display layer is located in the stack between the deformable transparent surface layer and the piezo-electric layer.

4. The display structure according to claim 2 in which the piezo-electric layer is located in the stack between the deformable transparent surface layer and the visual display layer.

5. The display structure according to claim 2 in which the different layers of the stack are glued together.

6. The display structure according to claim 1 in which the deformable transparent surface layer is glass.

7. The display structure according to claim 1 in which the visual display layer is an organic light emitting diode 'OLED' display.

8. The display structure according to claim 1 and further comprising a second drive circuit in electrical communication with the piezo-electric layer, wherein the second drive circuit is arranged to send a second drive signal to the piezo-electric layer which will cause the piezo-electric layer to deform the deformable transparent surface layer to generate a haptic output.

9. A method of providing a visual and audio output comprising:
   providing a display structure comprising:
   a deformable transparent surface layer comprising an outer edge that is directly coupled to a structure of a mobile device;
   a visual display layer visible through the deformable transparent surface layer;
   a piezo-electric layer in mechanical communication with the deformable transparent surface layer; and
   providing a drive signal to the piezo-electric layer, whereby the drive signal will cause the piezo-electric layer to deform the deformable transparent surface layer to generate an audio output.

10. The method of claim 9 in which the deformable transparent surface layer, the visual display layer, and the piezo-electric layer are arranged in a stack.

11. The method of claim 10 in which the visual display layer is located in the stack between the deformable transparent surface layer and the piezo-electric layer, or the piezo-electric layer is located in the stack between the deformable transparent surface layer and the visual display layer.

12. The method of claim 9 in which the method further comprises providing a second drive signal to the piezo-electric layer, whereby the second drive signal will cause the piezo-electric layer to deform the deformable transparent surface layer to generate a haptic output.

13. A mobile device comprising a display, the display comprising:
   a deformable transparent surface layer comprising an outer edge that is directly coupled to a structure of a mobile device;
   a visual display layer visible through the deformable transparent surface layer; and
   a piezo-electric layer in mechanical communication with the deformable transparent surface layer;
   wherein the display is rigidly secured to a structure of the mobile device; and
   the mobile device further comprises a drive circuit in electrical communication with the piezo-electric layer, wherein the drive circuit is arranged to send a drive signal to the piezo-electric layer which will cause the piezo-electric layer to deform the deformable transparent surface layer to generate an audio output.

14. The mobile device according to claim 13 in which the deformable transparent surface layer is rigidly secured to the structure of the mobile device.

15. The mobile device according to claim 14 in which the deformable transparent surface layer is rigidly secured to the structure of the mobile device by glue.

16. The mobile device according to claim 13 in which the display is rigidly secured to a structure of the mobile device to prevent relative movement of the display and the structure of the mobile device in a direction perpendicular to the deformable transparent surface.

17. The mobile device according to claim 13 in which the display is rigidly secured to a frame of the mobile device.

18. The mobile device according to claim 13 in which the deformable transparent surface layer, the visual display layer, and the piezo-electric layer are arranged in a stack.

19. The mobile device according to claim 13 in which the visual display layer is located in the stack between the deformable transparent surface layer and the piezo-electric layer, or the piezo-electric layer is located in the stack between the deformable transparent surface layer and the visual display layer.

20. The mobile device according to claim 13 in which the mobile device further comprises a second drive circuit in electrical communication with the piezo-electric layer, wherein the second drive circuit is arranged to send a second drive signal to the piezo-electric layer which will cause the piezo-electric layer to deform the deformable transparent surface layer to generate a haptic output.

* * * * *